Jan. 21, 1941.　　　L. BISHOP　　　2,229,363
MOWING MACHINE
Filed Dec. 20, 1938　　　3 Sheets-Sheet 1

Lewis Bishop
INVENTOR.
BY Knowles
ATTORNEYS.

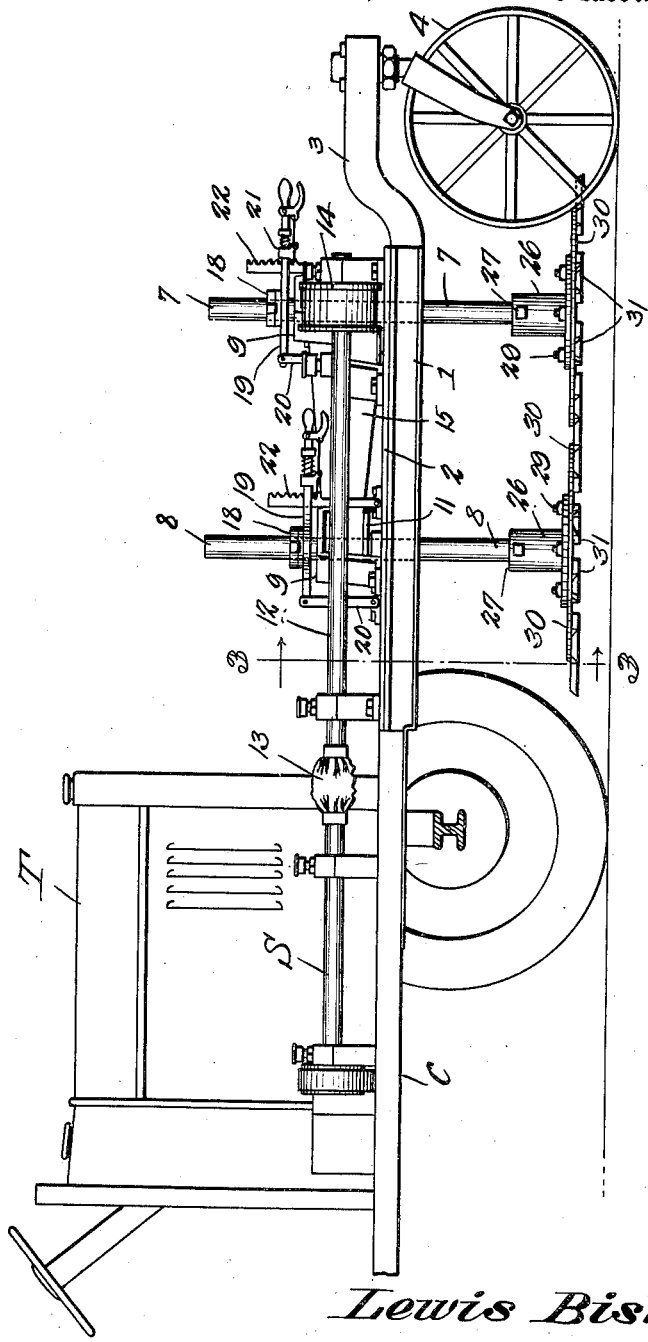

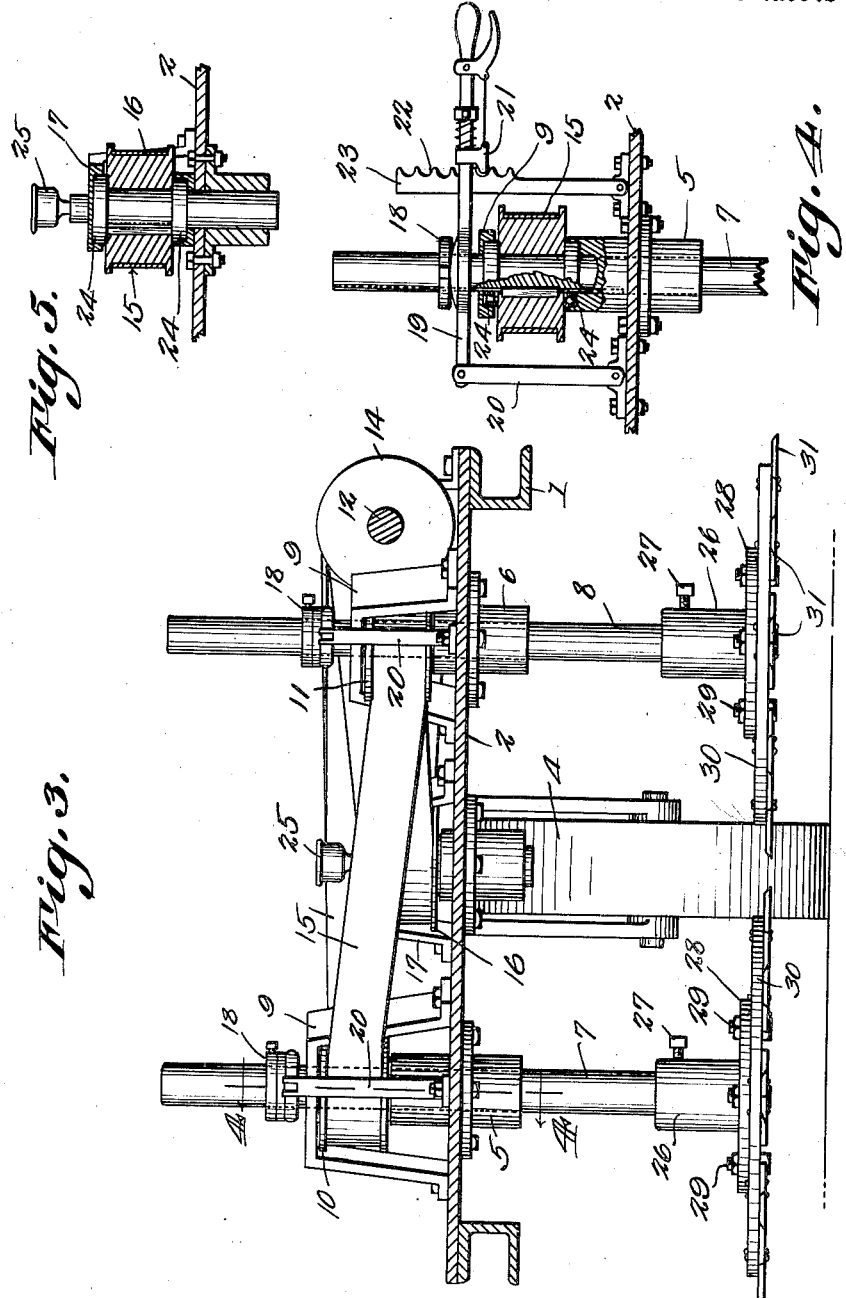

Patented Jan. 21, 1941

2,229,363

UNITED STATES PATENT OFFICE 2,229,363

MOWING MACHINE

Lewis Bishop, Arcadia, Fla.

Application December 20, 1938, Serial No. 246,874

2 Claims. (Cl. 56—25.4)

This invention relates to a mowing machine designed primarily for use in cutting down tall grass and weeds along the sides of roads, in fields, orchards, and other places where difficulty frequently is experienced in removing these objectionable growths.

An object of the invention is to provide a device of this character which can be connected readily to the front end of a tractor or other motor vehicle, said platform being equipped with the mowing elements which, in turn, are driven from the motor of the vehicle.

A further object is to provide a mower utilizing laterally spaced rotary cutting elements adapted to be driven at high speed, means being employed whereby these elements can readily be adjusted upwardly and downwardly while rotating.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 2 is a side elevation, the axle of the vehicle being shown in section.

Figure 3 is an enlarged section on line 3—3, Figure 2.

Figure 4 is an enlarged view partly in elevation and partly in section showing the spindle adjusting means and adjacent parts.

Figure 5 is a vertical section through one of the belt pulleys and its bearing.

Figure 1:
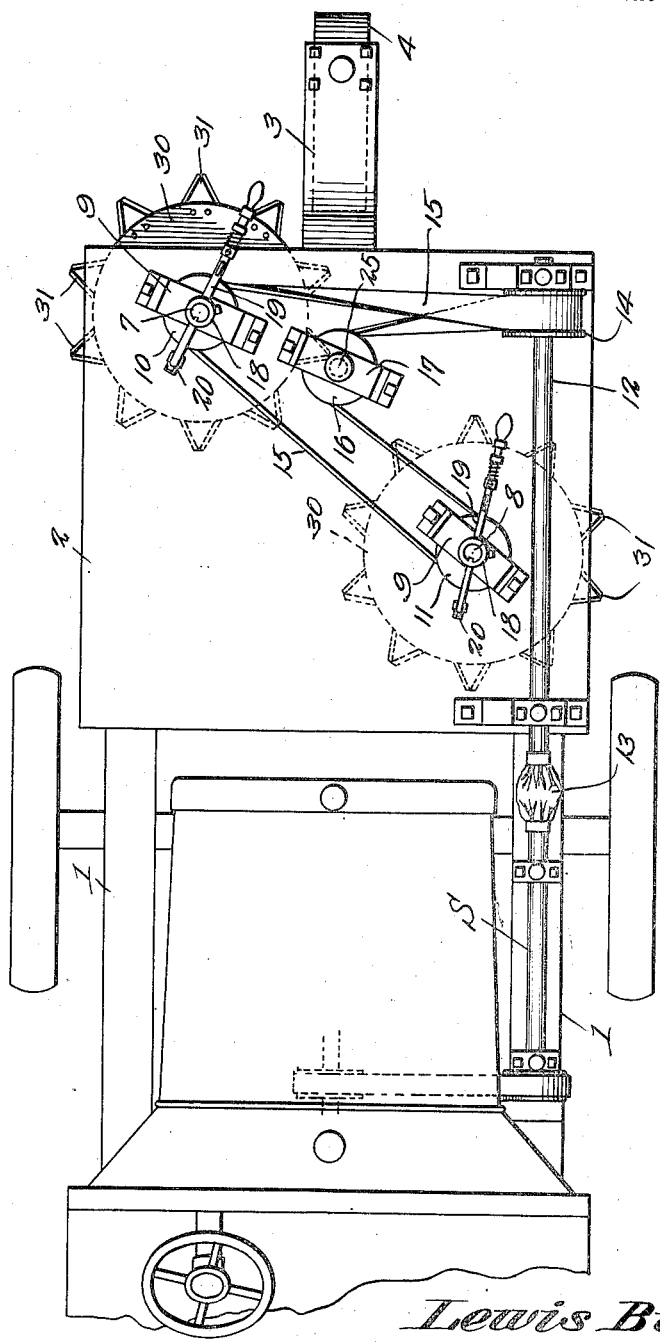
Figure 1 is a plan view of the mower attached to the front end portion of a motor vehicle a portion of which is shown.

Referring to the figures by characters of reference 1 designates a frame formed of channel beams or any other suitable material the front end portions of which are connected by a platform 2 while the rear end portions are adapted to extend back to the chassis C of a tractor or other motor vehicle T which, as shown, is provided at one side with a power shaft S adapted to be driven by the motor of the vehicle by means commonly employed for that purpose.

Extending forwardly from the center of the platform is a tongue 3 supported by a pilot wheel or caster 4.

Secured to the platform 2 adjacent to one side thereof is a bearing 5 and another bearing 6 is secured to the platform adjacent to the opposite side thereof. Bearing 5 is positioned adjacent to the forward end of the platform while bearing 6 is positioned adjacent to the rear end thereof. In these bearings are journalled spindles 7 and 8 respectively and the upper portions of the spindles extend through brackets 9 mounted on and secured to the platform. Spindle 7 has a pulley 10 secured thereto between its bracket 9 and the upper end of bearing 5 while another pulley 11 is secured to spindle 8 between its bracket 9 and bearing 6. The two spindles are adapted to slide in the respective pulleys but to rotate therewith.

A longitudinal shaft 12 is journalled on the platform adjacent to one side thereof and is so located that when this platform is properly positioned in front of the vehicle T, shaft 12 will aline with the shaft S, the two shafts being joined by a universal coupling indicated generally at 13.

A pulley 14 is secured to shaft 12 and is adapted to drive a belt 15 which engages the two pulleys 10 and 11 and also engages an idler pulley 16 located between platform 2 and a bracket 17. Thus it will be noted that when shaft 12 is rotated, motion will be transmitted therefrom through the belt to the two spindles 7 and 8 which will be rotated in the same direction at a high speed.

Each of the spindles 7 and 8 is provided with a collar 18 and an adjusting lever 19 embraces each spindle below the collar. This lever is fulcrumed at one end on a bracket 20 as shown for example in Figure 4 while its other end carries a spring-pressed dog 21 adapted to engage any one of a series of notches 22 formed within a bar 23. Obviously by means of lever 19 its spindle 7 or 8 can be lifted and supported at a desired elevation without, however, interfering with its rotation. By releasing dog 22, the spindle can be lowered to a desired point.

These spindles are preferably supported by tapered anti-friction bearing elements as indicated generally at 24. Oil cups 25 can be located wherever found desirable.

To the lower end of each of the spindles 7 and 8 is secured a sleeve 26, the same being held thereto by a set screw 27 or the like. Each sleeve extends upwardly from the center of a flange 28 which, in turn, is bolted as at 29 to a disk 30. Cutting teeth 31 are fastened to the marginal portion of the disk 30 and extend radially therebeyond and the two disks are so located with respect to each other that the swaths cut by the two disks will come together or slightly lap thereby insuring an unbroken cut the width of which is substantially equal to the combined maximum diameters of the two cutting elements. As the two disks rotate simultaneously in a counter-clockwise direction as viewed in Figure 1, the grass or other vegetation cut by the front disk will be thrown thereby from the left side of the machine and the vegetation cut by the other disk will be thrown to the left and back of the front disk. Thus there is no danger of the cut material being thrown into the path of one of the cutting disks and interfering with the cutting operation by that disk.

The apparatus herein described is readily connected to the front end of a tractor and thereafter the same is driven forwardly at the point where the cut is to be made. Any necessary up and down adjustment of the cutting element is effected readily by means of the levers 19 and as the belt 15 is driven constantly by the shaft 12, the spindles 7 and 8 are continuously rotated at a high speed so that the teeth 31 will cut through the vegetation in the path thereof and clear said path.

What is claimed is:

1. A mowing attachment for motor driven vehicles including a platform, a supporting wheel at the front end thereof, means for attaching the rear end of the platform to the front of a motor vehicle, front and back upwardly extending spindles mounted for rotation in the platform, said spindles being disposed in a line extending diagonally across the platform, front and back rotatable cutters secured to the lower ends of the respective spindles, each cutter including a disk and radial teeth extending from the disk at the periphery thereof, means driven by the shaft for simultaneously rotating the spindles in the same direction thereby to operate the front cutter to throw cut material laterally beyond one side of the machine and the rear cutter to throw cut material laterally into position back of the front cutter, and means for coupling said shaft to a drive shaft on the vehicle.

2. A mowing apparatus including a platform for attachment to the front end of a vehicle, supporting wheels for the platform, front and back vertical spindles positioned adjacent to the respective sides of the platform and mounted for rotation in the platform, front and back cutters connected to and rotatable with the respective spindles, and means for simultaneously rotating the spindles and cutters in one direction, the front cutter constituting means for throwing cut material laterally beyond one side of the platform and the rear cutter constituting means for throwing cut material laterally into position back of the front cutter, said cutters being positioned relative to each other to cut meeting swaths extending throughout the width of the platform.

LEWIS BISHOP.